(12) United States Patent
Arumugam et al.

(10) Patent No.: US 12,536,372 B2
(45) Date of Patent: Jan. 27, 2026

(54) LARGE LANGUAGE MODELS FOR EXTRACTING CONVERSATIONAL-STYLE EXPLANATIONS FOR ENTITY MATCHES

(71) Applicant: SAP SE, Walldorf (DE)

(72) Inventors: Rajesh Vellore Arumugam, Singapore (SG); Anantharaman Ravi, Singapore (SG); Matthias Frank, Heidelberg (DE); Sundeep Gullapudi, Singapore (SG); Yi Quan Zhou, Singapore (SG)

(73) Assignee: SAP SE, Walldorf (DE)

( * ) Notice: Subject to any disclaimer, the term of this patent is extended or adjusted under 35 U.S.C. 154(b) by 321 days.

(21) Appl. No.: 18/358,225

(22) Filed: Jul. 25, 2023

(65) Prior Publication Data

US 2025/0077773 A1 Mar. 6, 2025

(51) Int. Cl.
*G06F 40/284* (2020.01)
*G06F 16/248* (2019.01)
*G06F 40/40* (2020.01)
*G06N 20/00* (2019.01)

(52) U.S. Cl.
CPC .......... *G06F 40/284* (2020.01); *G06F 16/248* (2019.01); *G06F 40/40* (2020.01); *G06N 20/00* (2019.01)

(58) Field of Classification Search
CPC ....... G06F 40/284; G06F 16/248; G06F 40/40
See application file for complete search history.

(56) References Cited

U.S. PATENT DOCUMENTS

| 12,124,468 B1 | 10/2024 | Zhou |
| 12,218,890 B2* | 2/2025 | Abraham ................ H04L 51/04 |
| 2015/0095840 A1 | 4/2015 | Soshin et al. |
| 2022/0270721 A1 | 8/2022 | Schrempf et al. |
| 2024/0070394 A1 | 2/2024 | Peng et al. |
| 2024/0086648 A1 | 3/2024 | Han et al. |
| 2024/0095077 A1 | 3/2024 | Singh et al. |
| 2024/0144346 A1 | 5/2024 | Alkan et al. |
| 2024/0146563 A1 | 5/2024 | Sheth |
| 2024/0249080 A1 | 7/2024 | Sun et al. |
| 2024/0296279 A1* | 9/2024 | Gardner ................ G06F 40/169 |
| 2024/0386462 A1* | 11/2024 | Qi ....................... G06Q 30/0255 |
| 2024/0419698 A1* | 12/2024 | Ananthanarayanan ..................... G06F 16/335 |

OTHER PUBLICATIONS

U.S. Appl. No. 18/454,905, Zhou, Generative Graphical Explanation using Large Language Models in Ai-Based Services, filed Aug. 24, 2023, 30 pages.
Non-Final Office Action in U.S. Appl. No. 18/454,905, mailed on May 8, 2024, 16 pages.

* cited by examiner

*Primary Examiner* — Linda Wong
(74) *Attorney, Agent, or Firm* — Fish & Richardson P.C.

(57) ABSTRACT

Methods, systems, and computer-readable storage media for receiving, by an entity matching ML model, a query and target pair including a query entity and a target entity, providing, by the entity matching ML model, a query-target prediction by processing the query entity and the target entity, the query-target prediction indicating a match type between the query entity and the target entity, generating a prompt by populating a prompt template with at least a portion of the query-target prediction, inputting the prompt into a large language model (LLM), and receiving, from the LLM, an explanation that is responsive to the prompt and that describes one or more reasons for the query-target prediction output by the entity matching ML model.

17 Claims, 6 Drawing Sheets

LARGE LANGUAGE MODELS FOR EXTRACTING CONVERSATIONAL-STYLE EXPLANATIONS FOR ENTITY MATCHES

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to a machine learning (ML) system for matching a query entity to one or more target entities. More particularly, implementations of the present disclosure are directed to using large language models (LLMs) to extract conversational-style explanations for entity matches output from ML systems.

In some implementations, actions include receiving, by an entity matching ML model, a query and target pair including a query entity and a target entity, providing, by the entity matching ML model, a query-target prediction by processing the query entity and the target entity, the query-target prediction indicating a match type between the query entity and the target entity, generating a prompt by populating a prompt template with at least a portion of the query-target prediction, inputting the prompt into a large language model (LLM), and receiving, from the LLM, an explanation that is responsive to the prompt and that describes one or more reasons for the query-target prediction output by the entity matching ML model. Other implementations of this aspect include corresponding systems, apparatus, and computer programs, configured to perform the actions of the methods, encoded on computer storage devices.

These and other implementations can each optionally include one or more of the following features: the prompt template includes placeholders that are populated by a prompt generator using the at least a portion of the query-target prediction; the prompt is further generated based on a token explanation that is output by the entity matching ML model; the prompt is further generated based on a confidence that is output by the entity matching ML model, the confidence representing a likelihood that the query-target prediction is correct; the LLM comprises ChatGPT; actions further include providing a conversational interface that is operable to display the explanation to a user and receive input from the user to query the LLM; and the match type includes one of a single match, a multi-match, and no match.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
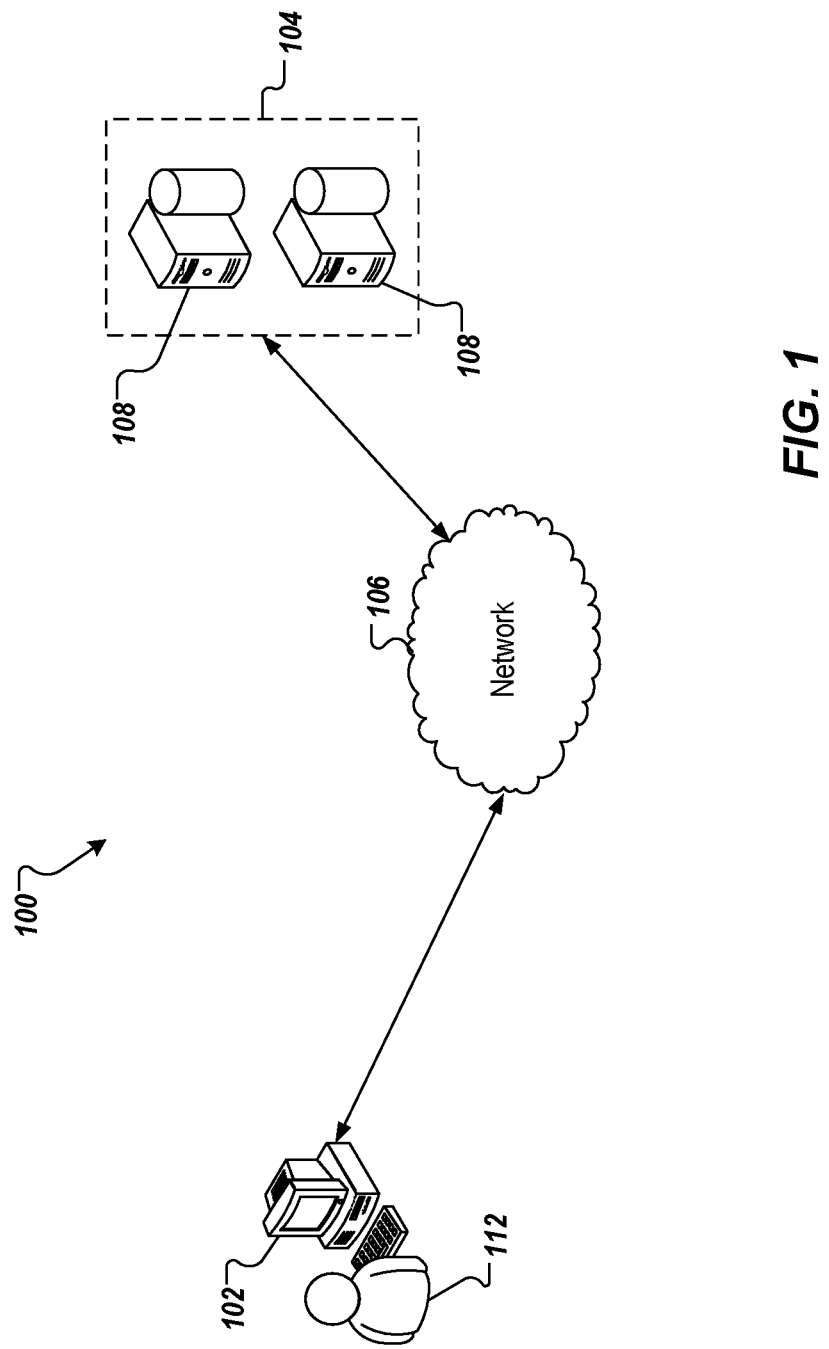
FIG. 1 depicts an example architecture that can be used to execute implementations of the present disclosure.

Implementations of the present disclosure are directed to a machine learning (ML) system for matching a query entity to one or more target entities. More particularly, implementations of the present disclosure are directed to using large language models (LLMs) to extract conversational-style explanations for entity matches output from ML systems.

Implementations can include actions of receiving, by an entity matching ML model, a query and target pair including a query entity and a target entity, providing, by the entity matching ML model, a query-target prediction by processing the query entity and the target entity, the query-target prediction indicating a match type between the query entity and the target entity, generating a prompt by populating a prompt template with at least a portion of the query-target prediction, inputting the prompt into a large language model (LLM), and receiving, from the LLM, an explanation that is responsive to the prompt and that describes one or more reasons for the query-target prediction output by the entity matching ML model.

To provide context for implementations of the present disclosure, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

The problem of matching entities represented by computer-readable records (electronic documents) appears in many contexts. Example contexts can include matching product catalogs, deduplicating a materials database, and matching incoming payments from a bank statement table to open invoices. Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Technologies related to artificial intelligence (AI) and ML, AI and ML being used interchangeably herein, have been widely applied in various fields. For example, ML-based decision systems can be used to make decisions on subsequent tasks. With reference to the example context, an ML-based decision system can be used to determine matches between bank statements and invoices. For example, invoices can be cleared in an accounting system by matching invoices to one or more line items in bank statements. In other contexts, decisions on treatment courses of patients (e.g., prescribe/not prescribe a drug) and/or decisions on whether to approve customers for loans can be made based on output of ML-based decision systems. In general, an output of a ML-based decision system can be referred to as a prediction or an inference result.

However, the use of ML model in decision systems present unique challenges that did not previously exist in the pre-ML world. One challenge is that the ML models that underly ML-based decision systems are black-box to users. For example, data is input to a ML model, and the ML model provides output based on the data. The ML model, however, does not provide an indication as to what resulted in the output (i.e., why the ML model provided the particular inference result). In view of this, so-called explainable AI (XAI) has been developed to make the black-box of AI more transparent and understandable. In general, XAI refers to methods and techniques in the application of AI to enable results being more understandable to users and can include providing reasoning for inference results and presenting inference results in an understandable way.

While ML models that underly entity matching tasks are quite robust and generally make accurate predictions, it can be difficult for users to understand why a specific prediction was made even when it is correct. With reference to the example context, though the ML model can output features from a query entity and one or more target entities as explanations as to predictions, such so-called explainable features are largely not human-readable and/or not intuitive. This is because both the query and target entities are semi-structured data having incomprehensible string tokens and numbers.

To highlight these issues, the following example explanation features can be considered:

Some numbers or words from the bank statement MEMOLINE field match with those from the invoice ASSIGNMENTREFERENCE field Some numbers or words from the bank statement MEMOLINE field match with those from the invoice DOCUMENTREFERENCEID field Users of such ML models used for entity matching (also referred to as generic line-item matching (GLIM) models) require intuitive, human-readable explanations to understand the predictions for compliance and/or audit purposes, for example.

In view of the above context, implementations of the present disclosure generate human-readable and intuitive explanations for ML-based entity matches to address challenges of ML-based systems. More particularly, and as described in further detail herein, implementations of the present disclosure use LLMs to extract conversational-style explanations for entity matches output from ML models.

Implementations of the present disclosure are described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML-based decision system that predicts matches between entities (e.g., CashApp, referenced by way of example herein). Also in accordance with implementations of the present disclosure, the server system 104 can host one or more LLMs that the ML-based decision system can interact with to provide conversational-style explanations for matches predicted by the ML-based decision system, as described in further detail herein.

Figure 2:
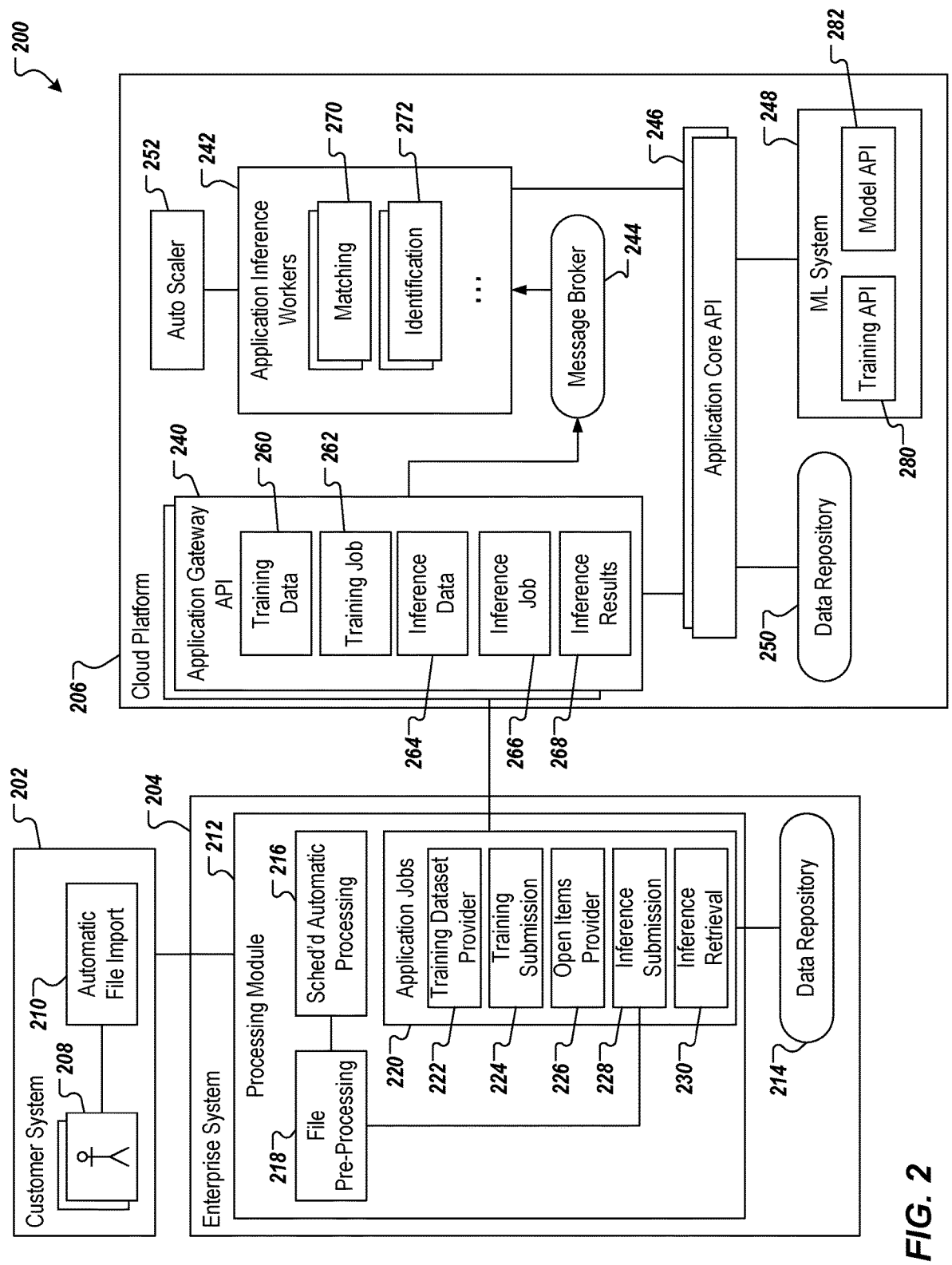
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance-accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP AI Core. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

Figure 3:
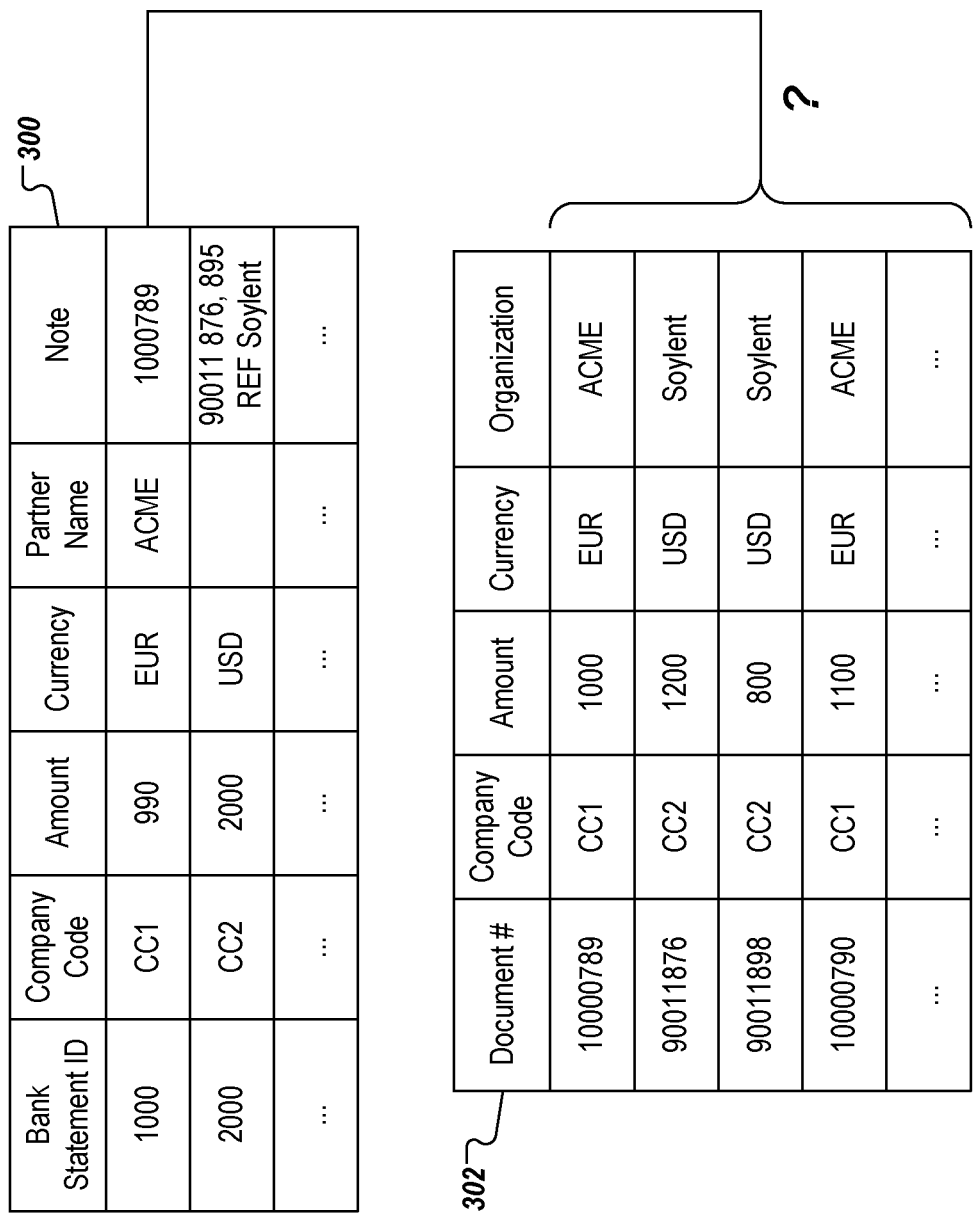
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model (matching model) is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p}$ {$p_0$, $p_1$, $p_2$}. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0$=0.13, $p_1$=0.98, and $p_2$=0.07. Consequently, the ML model can assign the class 'single match' ($l_1$) to the item pair $\vec{a}$, $\vec{b}$.

Figure 4:
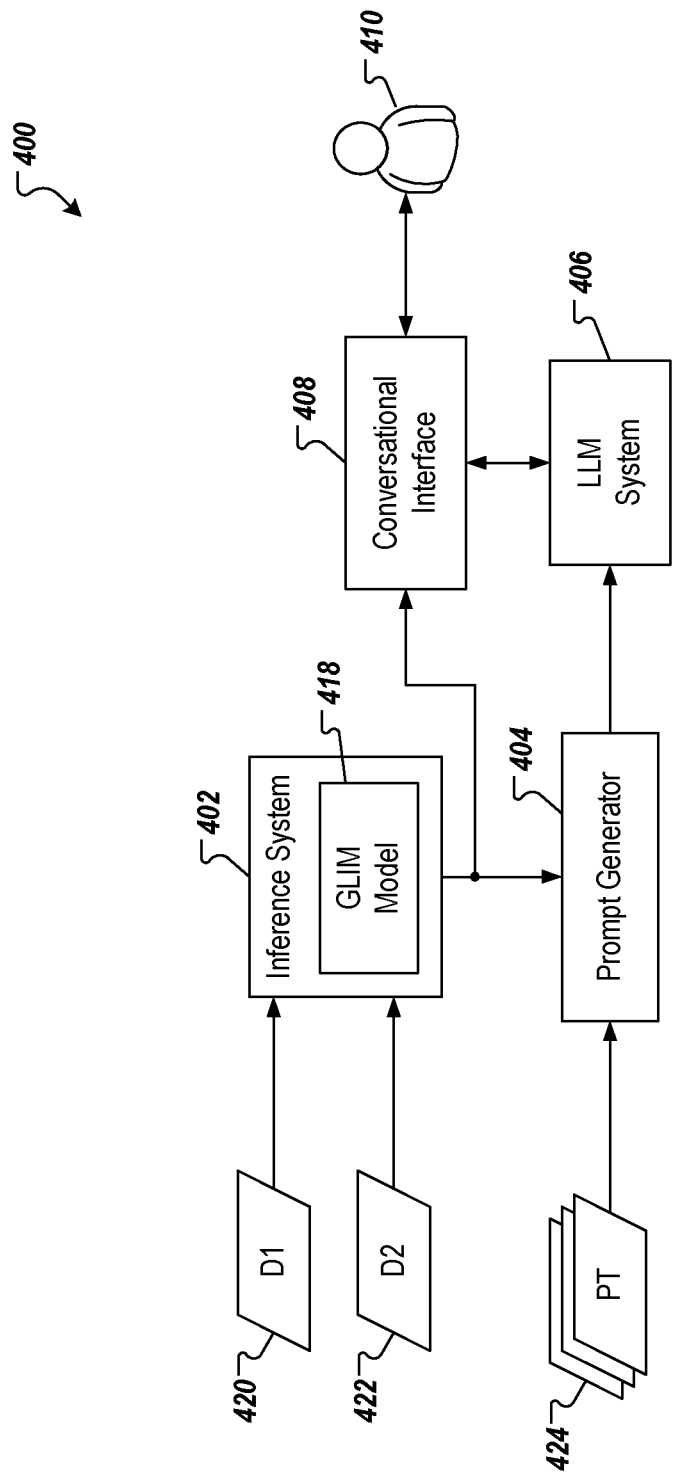
FIG. 4 depicts an example conceptual architecture in accordance with implementations of the present disclosure.

As introduced above, implementations of the present disclosure use LLMs to extract conversational-style explanations for entity matches output from ML models. FIG. 4 depicts an example conceptual architecture 400 in accordance with implementations of the present disclosure. In the example of FIG. 4, the conceptual architecture 400 includes an inference system 402, a prompt generator 404, a LLM system 406, and a conversational interface 408. In some examples, a user 410 can interact with the inference system 402 and the LLM system 406 through the conversational interface 408, as described in further detail.

In accordance with implementations of the present disclosure, the inference system 402 executes a GLIM model 418 that processes documents 420, 422 to generate inference results, also referred to herein as predictions. For example, and with reference to the non-limiting example context, the document 420 can be provided as a computer-readable document that records line-items of one or more banks statements, and the document 422 can be provided as a computer-readable document that records details of one or more invoices.

As described in further detail herein, the inference results are provided to the prompt generator 404, which generates one or more prompts as input to the LLM system 406 based on a set of prompt templates (PTs) 424. In some examples, the inference results include a predicted match between an entity (e.g., a line item of a bank statement) and one or more entities (e.g., one or more invoices) and a confidence score. In some examples, the confidence score represents a confidence (determined by the GLIM model 418) that the predicted match is correct (e.g., a likelihood that the predicted match is correct).

The LLM system 406 generates an explanation as to why the predicted match was generated by the inference system 402. In some examples, the LLM system 406 executes any appropriate LLM. Example LLM's can include, without limitation, ChatGPT, Microsoft Chatbot, Bard, end the like. For example, prompt and any other appropriate information, can be provided to the LLM system 406 through, for example, an application programming interface (API) that is exposed by the LLM system 406.

In some examples, the conversational interface 408 provides the inference results and the explanation to the user 410. In some examples, the user 410 can provide input to the LLM system 406 (e.g., prompts) for further exploration as to reasoning behind the inference results.

In further detail, the inference results include a query-target prediction pair from the line-item matching model (the GLIM model 218) that is used to generate a human-readable text using a prompt template of a set of prompt templates. In some examples, each prompt template is derived based on the columns in the query entity and the target entit-y/-ies. For the given prediction, query text, target text, the confidence score, and, in some examples, one or more explanation tokens from the line-item matching model, are input to the LLM (e.g., executed by the LLM system 406). This input functions as a prompt and sets up the context for the LLM for further queries (e.g., input by the user 410 through the conversational interface 408) for explanations. In some examples, the prompt generator 404 queries (issues prompts to) the LLM to provide detailed explanations for matching items.

As described in detail herein, implementations of the present disclosure convert semi-structured query-target data to a human-readable LLM prompt. Because LLMs are trained on a large corpus of natural language text, LLMs expect prompts to be in the same format. That is, empirically, LLMs perform best when prompts are in such a format. To this end, implementations of the present disclosure convert the semi-structured format of queries (e.g., line items of bank statements) and targets (invoices) into natural language text. This is achieved by using a fixed-text prompt template based on a set of columns in both the query and target entities. To generate the LLM prompt, the prompt template is populated with actual column values from both the query and target entities.

For example, and without limitation, the following example prompt template can be considered:

Bank statement of amount [BS_AMNT] from [NAME] matches with invoice of amount [IV_AMNT] with document number [DOC_#] with confidence of [CONF]. The explanation from the model is [GLIM_EXP]

In the above example, each of the bracketed ([ ]) variables is a placeholder that is filled in by the prompt generator based on the information provided from the inference system. For example, an example prediction can include a match between a bank statement and an invoice with the following information:

| Bank Statement | | | | |
|---|---|---|---|---|
| BS Key | BS Amount | Name | Currency | Memoline |
| 1 | 100 | Foo Company | EUR | Abc doc 123 |
| Invoice | | | | |
| IV Key | IV Amount | Debtor | Currency | Doc Number |
| 6 | 100 | FOO | EUR | 123 |

In this example, the prediction is provided with a confidence of 98% and a token explanation of "doc 123 matching memoline, amount 100 matching," both provided as output of the matching model. In this example, the following example prompt is generated using the above-example prompt template:

Bank statement of amount 100 from Foo matches with invoice of amount 100 with document number 123 with confidence of 98%. The explanation from the model is doc 123 matching memoline, amount 100 matching.

The prompt is provided as input to the LLM, which processes the prompt to provide a conversational-style explanation to the user.

In some implementations, token explanations (e.g., "doc 123 matching memoline, amount 100 matching") are derived from, in the example context, line-item matching, and are provided as input to the LLM as a conditioning prompt. This enables the explanations output from the LLM to be more specific to the matching query-target pair. In addition, multiple input confidences and explanations from the line-item matching model (for multi-matches) can enable the LLM to provide a summary explanation of the multi-match. For multi-match, the total amount of invoices is also provided as an optional input in the example context.

The conversational interface enables users to extract meaningful information as to reasoning for the match by drilling down on specific questions to the LLM. More particularly, and as described herein, the LLM is conditioned by the line-item matching and, after conditioning, provides meaningful, conservation-style reasoning for the match. For example, the user can query which vendor/customer made the most payment for what item/service. As another example, the conversational interface can also be used to query why a particular match was made with a low or high confidence based on the LLM conditioned on explanations input from the entity matching model.

In some examples, the conversational interface can generate predetermined questions as a list of choices that the user can select from for which the response from the LLM is shown. In some examples, the questions are generated based on the line-item matching elements or context. For such answers or explanations from the LLM, users can query for localized responses (e.g., explanation in the German language).

To illustrate implementations of the present disclosure, the following non-limiting examples can be considered in the example context of matching line-items of banks statements to invoices.

In one example, the ML model (e.g., entity matching ML model, GLIM model) can match a line-item of a bank statement to an invoice as a single match. For example, a bank statement #89509 with a bank statement key of F00120170009359200001, a memo line of 1800032334, and an amount of EUR 54 is matched to an invoice having an invoice key of F00120171800032334001, an organization name of Bohr and Hammer GmBH, a category to Tools, and an amount of EUR 54. In this example, the following example explanation can be provided as output of the LLM:

The bank statement matches the invoice, because they both have the same payment reference and customer comments (1800032334). They also have the same amount (54) and the same debtor (C0001). The assignment reference is blank in both the bank statement and the invoice.

As another example, the ML model (e.g., entity matching ML model, GLIM model) can match a line-item of a bank statement to an invoice as a multi-match. For example, a bank statement #82772 with a bank statement key of F00120170008683700001, a memo line of Hamburg Mall 1800020570 1800020571 1800020572, and an amount of EUR 222 is matched to an invoice having an invoice key of F00120171800020570001, an organization name of Hamburg Mall, a category to Shopping, and an amount of EUR 89, an invoice having an invoice key of F00120171800020571001, an organization name of Hamburg Mall, a category to Shopping, and an amount of EUR 54, and an invoice having an invoice key of F00120171800020572001, an organization name of Hamburg Mall, a category to Shopping, and an amount of EUR 79. In this example, the following example explanation can be provided as output of the LLM:

The bank statement matches the invoice, because the payment amount of (222) matches the total of the invoices (89+54+79). Additionally, each invoice has the same customer comments (Hamburg Mall) and the accounting documents (1800020570, 1800020571, 1800020572) match with the bank statement's customer comments.

Figure 5:
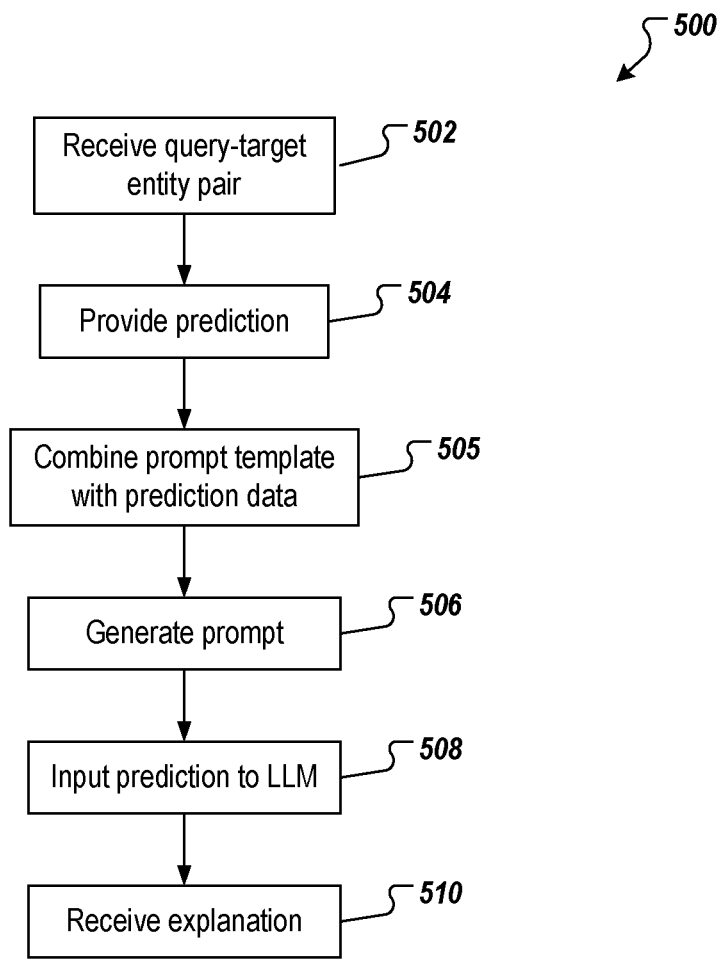
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A query and target pair are received (502). For example, and as described in detail herein, an entity matching ML model (e.g., a GLIM model) receives a query and target pair comprising a query entity and a target entity (e.g., a line-item of a bank statement and an invoice). A query-target prediction is provided (504). For example, and as described in detail herein, an inference system executing an entity matching ML model (e.g., GLIM model) provides a query-target prediction by processing the query entity and the target entity, the query-target prediction indicating a match type (e.g., single match, multi-match, no match) between the query entity and the target entity.

The prompt template is combined with prediction data (505). For example, and as described herein, the prompt template is filled with prediction data (e.g. bank statement and invoice data). A prompt is generated (506). For example, and as described herein, the prediction and additional information (e.g., confidence, token explanation) are provided to a prompt generator that generates the prompt using a prompt template. In some examples, the prompt generator fills in placeholders of the prompt template with information received from the inference system. The prompt is provided as input into a LLM (506). For example, and as described in detail herein, the prompt generator inputs the prompt to the LLM. In some examples, additional information is provided to the LLM (e.g., the inference result, the confidence score, the token explanation). An explanation is received (508). For example, and as described in detail herein, a conversational-style explanation is received from the LLM. The conversational-explanation describes one or more reasons for the query-target prediction output by the entity matching ML model.

Implementations of the present disclosure provide one or more technical advantages. As described in detail herein, implementations of the present disclosure exploit the expertise of an entity matching model (e.g., GLIM model) combined with a LLM to extract meaningful and intuitive explanations for matching pairs/entities, which neither of the model can provide independently. Further, implementations of the present disclosure provide a conversational interface that enables users to understand why a match was made by interactively asking questions to the LLM. The LLM, armed with the knowledge of the line-item matching model explanations, confidences, and inputs provides intuitive explanations for the various queries. Explanations generated can be dynamic with much more informative and human-readable. In previous approaches, tokens and features are attempted to be identified based on attention layers, and explanations are manually generated based on a predefined template which does not provide more context and information about the matching details.

Figure 6:
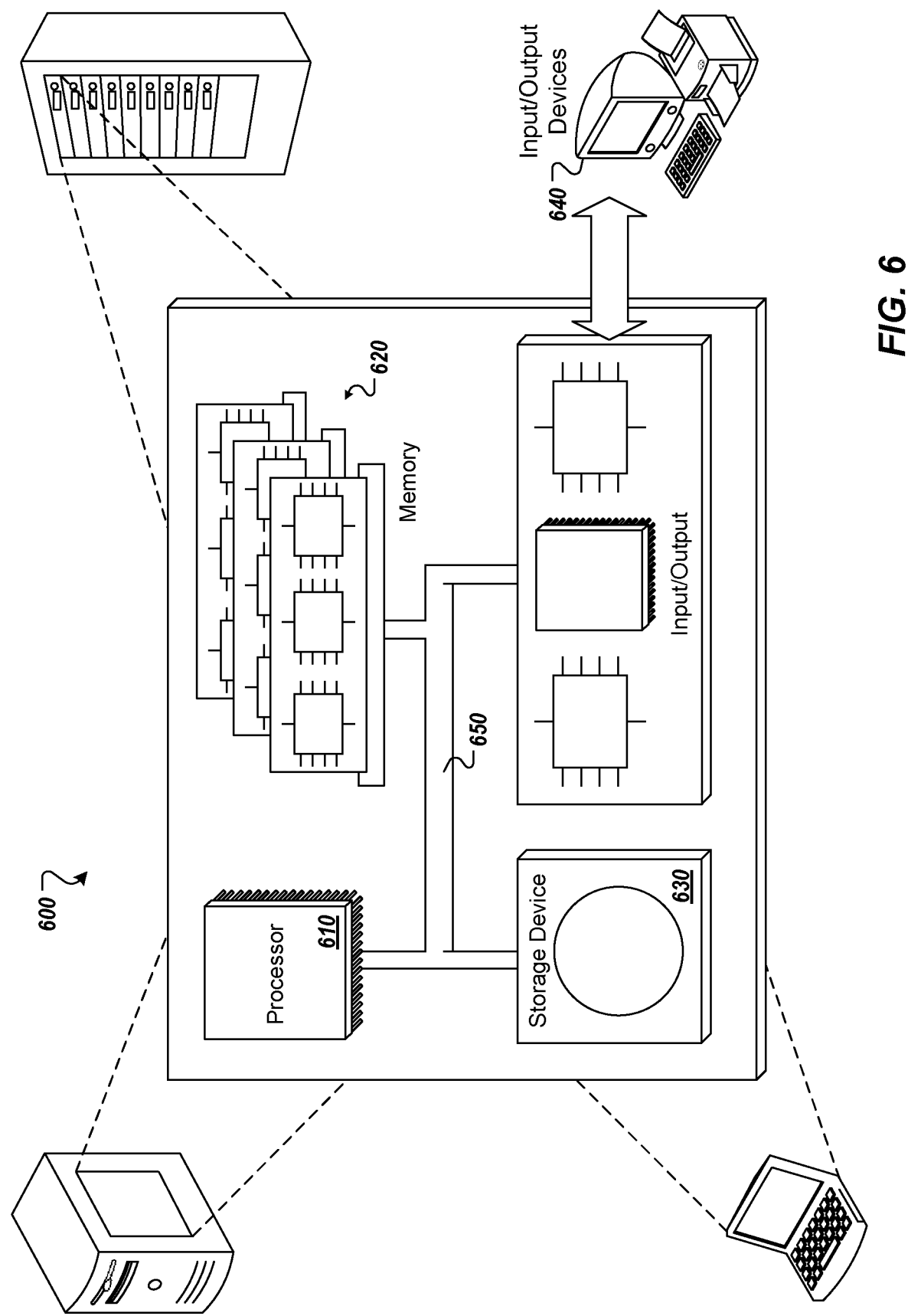
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for computer-executed entity matching using one or more machine learning (ML) models, the method being executed by one or more processors and comprising:
    receiving, by an entity matching ML model, a query and target pair comprising a query entity and a target entity;
    providing, by the entity matching ML model, a query-target prediction by processing the query entity and the target entity, the query-target prediction indicating a match type between the query entity and the target entity;
    generating a prompt by populating a prompt template with at least a portion of the query-target prediction, the prompt being generated based on a confidence that is output by the entity matching ML model, the confidence representing a likelihood that the query-target prediction is correct;
    inputting the prompt into a large language model (LLM); and
    receiving, from the LLM, an explanation that is responsive to the prompt and that describes one or more reasons for the query-target prediction output by the entity matching ML model.

2. The method of claim 1, wherein the prompt template comprises placeholders that are populated by a prompt generator using the at least a portion of the query-target prediction.

3. The method of claim 1, wherein the prompt is further generated based on a token explanation that is output by the entity matching ML model.

4. The method of claim 1, wherein the LLM comprises ChatGPT.

5. The method of claim 1, further comprising providing a conversational interface that is operable to display the explanation to a user and receive input from the user to query the LLM.

6. The method of claim 1, wherein the match type comprises one of a single match, a multi-match, and no match.

7. A non-transitory computer-readable storage medium coupled to one or more processors and having instructions stored thereon which, when executed by the one or more processors, cause the one or more processors to perform operations for computer-executed entity matching using one or more machine learning (ML) models, the operations comprising:
    receiving, by an entity matching ML model, a query and target pair comprising a query entity and a target entity;
    providing, by the entity matching ML model, a query-target prediction by processing the query entity and the target entity, the query-target prediction indicating a match type between the query entity and the target entity;
    generating a prompt by populating a prompt template with at least a portion of the query-target prediction, the prompt being generated based on a confidence that is output by the entity matching ML model, the confidence representing a likelihood that the query-target prediction is correct;
    inputting the prompt into a large language model (LLM); and
    receiving, from the LLM, an explanation that is responsive to the prompt and that describes one or more reasons for the query-target prediction output by the entity matching ML model.

8. The non-transitory computer-readable storage medium of claim 7, wherein the prompt template comprises placeholders that are populated by a prompt generator using the at least a portion of the query-target prediction.

9. The non-transitory computer-readable storage medium of claim 7, wherein the prompt is further generated based on a token explanation that is output by the entity matching ML model.

10. The non-transitory computer-readable storage medium of claim 7, wherein the LLM comprises ChatGPT.

11. The non-transitory computer-readable storage medium of claim 7, wherein operations further comprise providing a conversational interface that is operable to display the explanation to a user and receive input from the user to query the LLM.

12. The non-transitory computer-readable storage medium of claim 7, wherein the match type comprises one of a single match, a multi-match, and no match.

13. A system, comprising:
    a computing device; and
    a computer-readable storage device coupled to the computing device and having instructions stored thereon which, when executed by the computing device, cause the computing device to perform operations for computer-executed entity matching using one or more machine learning (ML) models, the operations comprising:
        receiving, by an entity matching ML model, a query and target pair comprising a query entity and a target entity;
        providing, by the entity matching ML model, a query-target prediction by processing the query entity and the target entity, the query-target prediction indicating a match type between the query entity and the target entity;

generating a prompt by populating a prompt template with at least a portion of the query-target prediction, the prompt being generated based on a confidence that is output by the entity matching ML model, the confidence representing a likelihood that the query-target prediction is correct;

inputting the prompt into a large language model (LLM); and receiving, from the LLM, an explanation that is responsive to the prompt and that describes one or more reasons for the query-target prediction output by the entity matching ML model.

14. The system of claim 13, wherein the prompt template comprises placeholders that are populated by a prompt generator using the at least a portion of the query-target prediction.

15. The system of claim 13, wherein the prompt is further generated based on a token explanation that is output by the entity matching ML model.

16. The system of claim 13, wherein the LLM comprises ChatGPT.

17. The system of claim 13, wherein operations further comprise providing a conversational interface that is operable to display the explanation to a user and receive input from the user to query the LLM.

* * * * *